United States Patent Office  2,996,135
Patented Aug. 15, 1961

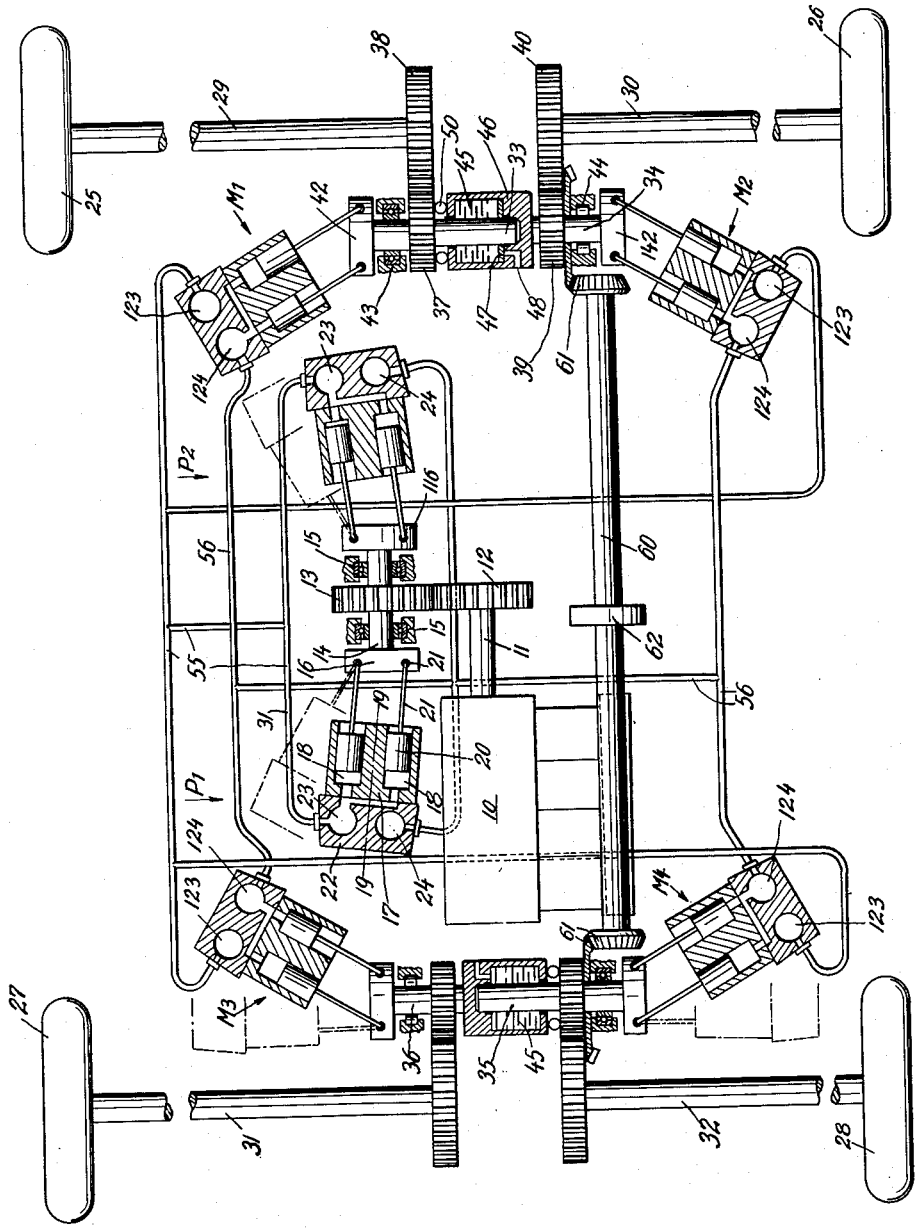
Aug. 15, 1961    F. G. GRABOW    2,996,135
HYDROSTATIC DRIVING MEANS FOR THE WHEELS OF
VEHICLES, PARTICULARLY MOTOR VEHICLES
Filed June 2, 1959
*Inventor*
FRITZ G. GRABOW
BY Dicke, Craig and Freudenberg
ATTORNEYS

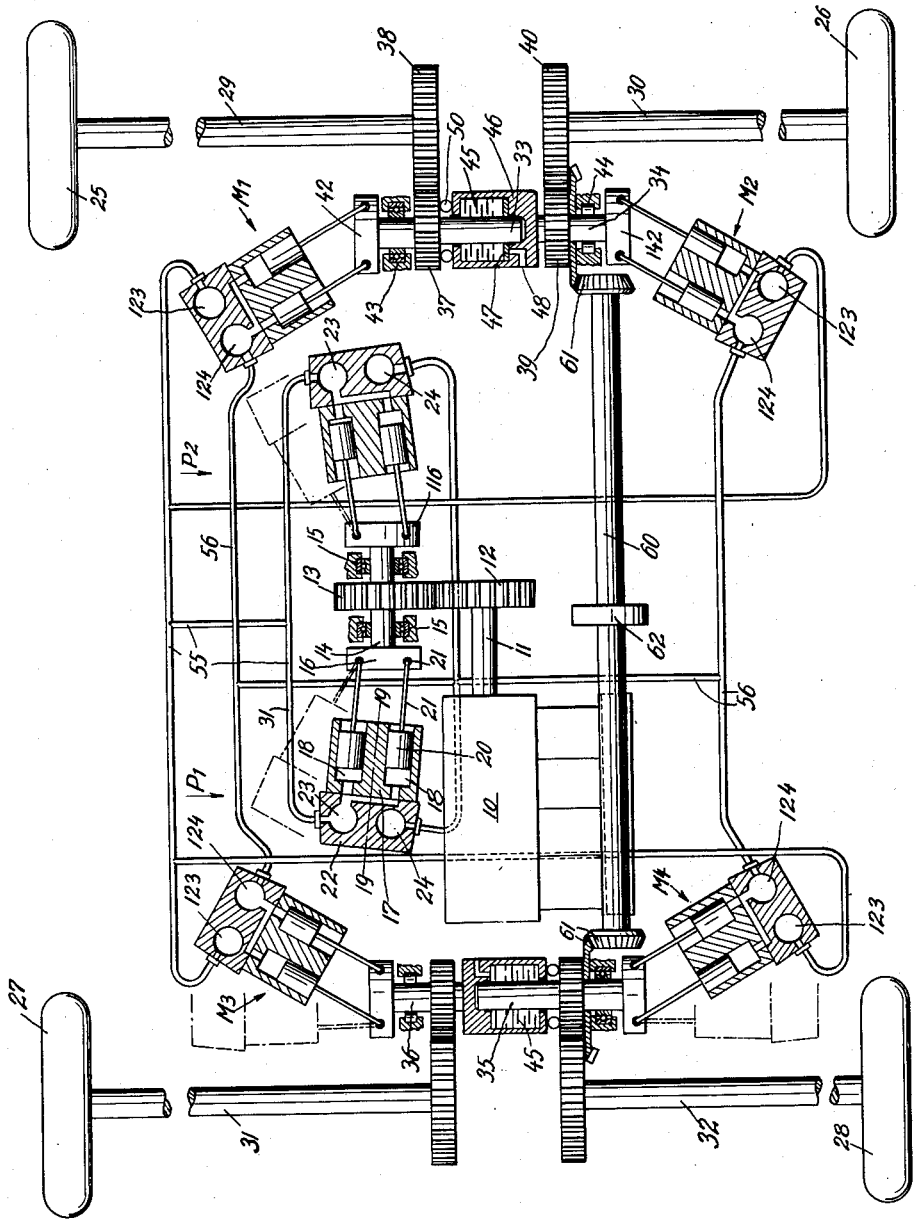

2,996,135
HYDROSTATIC DRIVING MEANS FOR THE WHEELS OF VEHICLES, PARTICULARLY MOTOR VEHICLES
Fritz G. Grabow, Stuttgart-Unterturkheim, Germany, assignor to Daimler-Benz Aktiengesellschaft, Stuttgart-Unterturkheim, Germany
Filed June 2, 1959, Ser. No. 817,617
Claims priority, application Germany June 6, 1958
10 Claims. (Cl. 180—44)

My invention relates to hydrostatic means for driving the wheels of vehicles, particularly of motor vehicles, such means including at least one pump of the swivel disk type driven by a prime mover and a plurality of fluid motors of the swivel disk type individually coordinated to wheels of the vehicle.

It is the object of my invention to provide a hydrostatic driving mechanism of the kind indicated which is simple and compact and affords a possibility of providing a differential lock for a pair of opposite driven wheels. More particularly, it is an object of the present invention to provide an improved hydrostatic driving unit for a pair of opposite driven wheels, such unit including a pair of fluid motors of the swivel disk type, a single thrust bearing and a clutch serving as a differential lock.

Further objects of my invention will appear from the detailed description of a preferred embodiment following hereinafter with reference to the accompanying drawing. It is to be understood, however, that the invention is in no way restricted to such details but is capable of numerous modifications within the scope of the appended claims and that the terms and phrases used in such detailed description have been chosen for the purpose of illustrating the invention rather than that of restricting or limiting same.

The drawing illustrates a plan view, partly in section, of my improved hydrostatic driving mechanism for a motor vehicle having two pairs of driven wheels, such driving mechanism including pumps and fluid motors shown in section.

A suitable prime mover, e.g. an engine 10, drives a shaft 11 connected by a pair of meshing gears 12 and 13 with a shaft 14 journaled by means of bearings 15 in a suitable housing (not shown) mounted in the chassis of the vehicle. Each end of the shaft 14 is rigidly connected to the swivel disk 16 or 116 of a fluid pump of the swivel disk type. As such fluid pumps are well known in the art a brief description thereof will suffice.

The fluid pump of the swivel disk type comprises a cylinder block 17 forming a plurality of cylinders 18 which extends parallel to and are circumferentially distributed about the axis 19—19 of the cylinder block 17. Each cylinder 18 accommodates a piston 20 slidably mounted therein and connected with a socket 21 provided on the swivel disk 16 near the periphery thereof by a connecting rod 21′. The axis 19—19 forms an obtuse angle with the axis of the shaft 14. Suitable adjusting means (not shown) may be provided for varying such obtuse angle. Such variation of the angle results in a variation of the piston displacement of the pump and, consequently, of the volume of fluid supplied by the pump in the course of one revolution thereof.

The cylinder block 17 is rotatable about its axis 19—19 and is connected with the swivel disk 16 for common rotation therewith by suitable means which may include the connecting rods 21′.

The cylinder block is mounted for rotation on a housing 22 in coaxial relationship thereto. This housing contains an inlet port communicating with a chamber 23 and an outlet port communicating with a chamber 24. These ports are provided in the face of the housing 22 abutting the rotary cylinder block 17 in such a manner that each of the ports may communicate with the cylinders 18 successively in the course of the rotation of the cylinder block.

Suitable means (not shown) are provided for guiding the housing 22 and the cylinder block 17 coaxially mounted thereon for angular adjustment between the position shown in dashdotted lines and the position shown in full lines. As explained hereinabove, such adjustment will vary the piston displacement.

The two pumps bearing the reference characters P1 and P2 may be of equal size. Either both of them may be of the adjustable displacement type or, if desired, one of them may have mounted its housing 22 and cylinder block 17 in fixed angular relationship to the shaft 14 and consequently will have a constant piston displacement.

Where both of the pumps P1 and P2 are adjustable, suitable means (not shown) may be provided for their individual adjustment or for their common adjustment. Unless both pumps are adjusted in common, the bearings 15 must be capable of taking up axial thrust or additional thrust bearings must be associated with the shaft 14.

The motor vehicle has two pairs of driven wheels, a rear pair 25, 26 and a front pair 27, 28. Driving shafts 29, 30, 31 and 32 are individually coordinated to the wheels and are connected therewith. Lay shafts 33, 34, 35 and 36 are individually coordinated to the drive shafts and extend parallel thereto. Each of a plurality of gearings connect one of the lay shafts with the associated drive shaft, each of such gearings comprising a pair of meshing gears 37, 38, and 39, 40 respectively, one of which is fixed to the lay shaft, whereas the other one is fixed to the drive shaft. The two lay shafts 33 and 34 coordinated to the drive shafts 29 and 30 of the pair of driven wheels 25 and 26 are coaxially disposed. Similarly, the lay shafts 35 and 36 are disposed in coaxial relationship. A pair of fluid motors M1 and M2 of the swivel disk type is provided in symmetrical relationship with respect to the central vertical longitudinal plane of the vehicle, the swivel disk 42, or 142 respectively, of each motor being fixed to one of the lay shafts 33, 34 to drive same. Each of these motors M1 and M2 may be of a type similar to that of the pumps P1 and P2 described hereinabove so that a detailed description of the fluid motors may be dispensed with. Either one or both of the motors M1 and M2 may be of the variable displacement type or of the constant displacement type. Each of the lay shafts 33, 34 is journaled in a suitable anti-friction bearing 43, or 44 respectively.

Two sets of interleaved annular friction disks 45 are mounted on the shaft 33. One of these sets is connected with shaft 33 for common rotation therewith. A housing 46 is fixed to the other lay shaft 34 and surrounds the sets of friction disks and is connected for common rotation with the other one of such sets. Suitable means are provided for pressing the sets of friction disks upon each other for frictionally coupling the lay shafts 33 and 34 to each other. In the embodiment shown such means include an annular disk-shaped piston 47 slidably guided in the cylindrical internal cavity of the housing 46 and a suitable source of liquid under pressure (not shown) communicating with a port 48 of housing 46 connected by a suitable conduit with the internal cavity thereof. When liquid under pressure is supplied to the port 48, the liquid will press the piston 47 upon the two sets of interleaved friction disks 45, thereby coupling the lay shaft 33 to the housing 46 fixed to the lay shaft 34. The friction clutch constituted by the sets of friction disks and the associated elements acts as a differential lock effective when thrown in to prevent any relative rotation of the drive shafts 29 and 30 and of the driven wheels 25 and 26 connected thereto.

A thrust bearing 50 which may be a suitable antifriction bearing or a sliding bearing is disposed between the swivel disks 42 and 142 for bracing the same axially against each other. In the embodiment shown this thrust bearing 50 is disposed within the space between the inner end face of the gear 37 and the opposed end face of the housing 46. In this manner the thrust bearing is also operative to axially brace the lay shafts 33 and 34 against each other. As in normal operation the two lay shafts 33 and 34 revolve at the same speed, the bearing 50 is subject to a minimum of wear and, therefore, will have a long life. Only when the vehicle is driven through a curve will the two lay shafts 33 and 34 rotate at different speeds and in that event the bearing 50 will be called upon to brace relatively rotating elements against each other.

Suitable means (not shown) are preferably provided enabling the driver to control the friction clutch constituted by the sets of friction disks 45 as desired. Hence, he may rigidly clutch the two lay shafts 33 and 34 to each other when he wishes to avoid slippage of one of the driven wheels on the ground.

The two motors M1 and M2, the lay shafts 33 and 34 connected therewith, the friction clutch formed by the disks 45 and the thrust bearing 50 may be combined to constitute an assembly unit which in assembled condition may be mounted in the chassis of the vehicle so as to bring the gears 37 and 39 into mesh with the gears 38 and 40.

If desired, the housing 46 and the gear 39 may be formed by an integral element.

The chambers 23 of the pumps P1 and P2 and similar chambers 123 of the fluid motors are put into permanent communication by suitable pipes 55. Similarly, the chambers 24 of the pumps P1 and P2 and similar chambers 124 of the motors are put into permanent communication by suitable pipes 56.

In the embodiment shown the driving means associated with the lay shafts 35 and 36 are similar to those described hereinabove. Hence, they include a pair of motors M3 and M4 which are similar to the motors M1 and M2 and need not be described in detail.

When the motors M1 and M2 are of the constant delivery type, the axes of the cylinder blocks being disposed in a fixed angular relationship to the lay shafts 33 and 34, then the pump P2 is preferably of the variable displacement type. In operation the fluid under pressure is circulated from the pumps P1 and P2 via the chambers 23 and the pipes 55 to the chambers 123 of the fluid motors M1, M2, M3 and M4 and is returned from the chambers 124 thereof through the pipes 56 and to the chambers 24 of the pumps P1 and P2.

If desired, however, one or both of the motors M1 and M2 and of the motors M3 and M4 may be of the variable displacement type. This results in an increased range of the adjustment of the ratio of transmission between the prime mover 10 and the driven wheels of the vehicle. Moreover, it would be possible to use pumps P1 and P2 of the constant delivery type and motors M1, M2, M3 and M4 of the variable displacement type. Moreover, it would be possible to drive one of the pairs of driven wheels by motors of the constant displacement type and to drive the other pair of driven wheels by motors of the variable displacement type. This is diagrammatically indicated in the drawing by an illustration showing the cylinder blocks of motors M3 and M4 in dashdotted lines in a position for a piston displacement reduced to a minimum. If desired, each of the motors M1, M2, M3 and M4 may be of the variable displacement type and the displacement of all of the motors may be controlled by common means.

In many cases it may be desirable to drive each of the wheels of a vehicle and to provide means for transferring the torques of all of the fluid motors to one pair of driven wheels or to a single driven wheel. This may be effected in accordance with the invention by providing for a suitable driving connection between the pair of lay shafts 35 and 36 and the pair of lay shafts 33 and 34. This connection may include a suitable shaft 60 geared by pairs of bevel gears 61 to shafts 34 and 35 and a disengageable clutch 62 may be inserted in the additional shaft. This clutch will be effective as a differential lock acting between the two pairs of driven wheels. When this clutch is engaged, and when the clutches 45 are engaged, combined driving torque produced by all of the motors M1, M2, M3 and M4 may be transferred to each of the driven wheels.

From the foregoing it will be seen that this invention is one well adapted to attain all of the objects hereinabove set forth, together with other advantages which are obvious and which are inherent to the combination.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a motor vehicle having at least one pair of opposite driven wheels, a prime mover, a pump connected therewith to be driven thereby, a pair of fluid motors of the swivel disk type individually coordinated to the wheels of said driven pair of wheels, and connected therewith to drive same, conduits connecting said pump with said fluid motors within a circuit causing the fluid fed by said pump to drive said fluid motors, the swivel disks of said motors being coaxially disposed, and a thrust bearing disposed between said swivel disks for bracing the same axially against each other.

2. The combination claimed in claim 1 further comprising a clutch for clutching said swivel disks to each other.

3. The combination claimed in claim 1 in which each of said fluid motors is of the type including a cylinder block having an axis and forming a plurality of cylinders circumferentially distributed about said axis and extending parallel thereto, a swivel disk mounted for rotation about an axis forming an angle with the axis of said cylinder block, and connecting rods connecting said swivel disk to said pistons.

4. The combination claimed in claim 1 in which said pump is a pump of the swivel disk type having a variable piston displacement.

5. In a motor vehicle having at least one pair of opposite driven wheels, driving shafts individually coordinated to said wheels and connected therewith, lay shafts individually coordinated to said drive shafts and extending parallel thereto, gearings each drivingly connecting one of said lay shafts with the associated drive shaft, the lay shafts coordinated to said drive shafts of said pair of driven wheels being coaxially disposed, at least one pair of fluid motors of the swivel disk type, the swivel disk of each motor being fixed to one of said lay shafts to drive same, and a thrust bearing disposed between the swivel disks of said motors and mounted on said lay shafts to axially brace the same against each other, and a source of fluid under pressure connected with said fluid motors to drive same.

6. The combination claimed in claim 5 further comprising a clutch connected to said lay shafts for clutching said lay shafts to each other.

7. The combination claimed in claim 5 further comprising two sets of interleaved friction disks, one set being mounted on and connected for common rotation with one of said lay shafts, a housing fixed to the other one of said lay shafts and surrounding said sets of friction disks and being connected for common rotation with the other one of said sets of disks, and means for pressing said sets of disks upon each other for frictionally coupling said lay shafts to each other.

8. The combination claimed in claim 7 in which each of said gearings includes a gear fixed to one of said lay shafts, said thrust bearing being disposed between said housing fixed to one of said lay shafts and said gear fixed to the other one of said lay shafts.

9. The combination claimed in claim 5 further including a clutch connected to said lay shafts for clutching the same to each other, said lay shafts, said gearings, said fluid motors and said clutch constituting an assembly unit.

10. A motor vehicle according to claim 5, wherein said thrust bearing means prevents transmission of axial thrust produced by said motors to said driving shafts.

References Cited in the file of this patent

UNITED STATES PATENTS

| | | |
|---|---|---|
| 2,833,362 | Martin | May 6, 1958 |
| 2,886,944 | Horwood | May 19, 1959 |